United States Patent
Ukai et al.

(10) Patent No.: US 12,392,641 B2
(45) Date of Patent: Aug. 19, 2025

(54) MAP INFORMATION OUTPUT DEVICE, AUTOMATIC DRIVING CONTROL SYSTEM, MAP INFORMATION OUTPUT SYSTEM, AND MAP INFORMATION OUTPUT METHOD

(71) Applicants: DENSO CORPORATION, Kariya (JP); TOYOTA JIDOSHA KABUSHIKI KAISHA, Toyota (JP)

(72) Inventors: Hiroki Ukai, Kariya (JP); Takao Kashu, Tokyo (JP); Chika Tsumori, Funabashi (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/657,295

(22) Filed: Mar. 30, 2022

(65) Prior Publication Data
US 2022/0316919 A1    Oct. 6, 2022

(30) Foreign Application Priority Data
Apr. 2, 2021 (JP) ................... 2021-063601

(51) Int. Cl.
*H04W 4/40* (2018.01)
*B60W 50/14* (2020.01)
(Continued)

(52) U.S. Cl.
CPC ......... *G01C 21/3896* (2020.08); *B60W 50/14* (2013.01); *B60W 60/0053* (2020.02);
(Continued)

(58) Field of Classification Search
CPC ..... B60W 2050/143; B60W 2050/146; B60W 2556/40; B60W 2556/50; B60W 50/14;
(Continued)

(56) References Cited

U.S. PATENT DOCUMENTS

2002/0067379 A1* 6/2002 Kenyon ................. G06T 17/05
                                                            715/838
2006/0122768 A1* 6/2006 Sumizawa ......... G01C 21/3889
                                                            340/995.14
(Continued)

FOREIGN PATENT DOCUMENTS

CN    101210959 A  *  7/2008
CN    103154666 A  *  6/2013 ............. G01C 11/06
(Continued)

*Primary Examiner* — Vivek D Koppikar
*Assistant Examiner* — Jeffrey R Chalhoub
(74) *Attorney, Agent, or Firm* — Maschoff Brennan

(57) ABSTRACT

A map information output device including a map information output unit that outputs control map information for automatic driving control of a vehicle to an automatic driving control unit The map information output device includes: a map storage unit storing an original map for constructing the control map information; a position obtainer obtaining a current position of the vehicle; a map information constructor sequentially constructing the control map information based on the original map of a first range determined with reference to the current position obtained by the position obtainer; and a download processor downloading and storing the original map of a second range, which is a range determined based on the current position and includes the first range, sequentially from a map distribution device outside the vehicle by wireless communication.

10 Claims, 7 Drawing Sheets

(51) Int. Cl.
  *B60W 60/00* (2020.01)
  *G01C 21/00* (2006.01)
  *G01C 21/32* (2006.01)

(52) U.S. Cl.
  CPC ......... *G01C 21/32* (2013.01); *G01C 21/3844* (2020.08); *G01C 21/387* (2020.08); *H04W 4/40* (2018.02); *B60W 2050/143* (2013.01); *B60W 2050/146* (2013.01); *B60W 2556/40* (2020.02); *B60W 2556/50* (2020.02)

(58) Field of Classification Search
  CPC ............... B60W 60/0053; G01C 21/32; G01C 21/3844; G01C 21/387; G01C 21/3896; H04W 4/40
  See application file for complete search history.

(56) References Cited

U.S. PATENT DOCUMENTS

| | | | | |
|---|---|---|---|---|
| 2013/0046465 | A1* | 2/2013 | Serbanescu | G01C 21/34 701/527 |
| 2014/0058661 | A1* | 2/2014 | Choi | G09B 29/106 701/428 |
| 2016/0036913 | A1* | 2/2016 | Romem | G06F 3/0652 709/219 |
| 2016/0140847 | A1* | 5/2016 | Kawamata | G08G 1/166 701/36 |
| 2016/0334239 | A1* | 11/2016 | Cho | G08G 1/0969 |
| 2017/0122754 | A1 | 5/2017 | Konishi et al. | |
| 2017/0123434 | A1* | 5/2017 | Urano | G08G 1/096791 |
| 2017/0323566 | A1 | 11/2017 | Suto | |
| 2018/0149488 | A1* | 5/2018 | Suto | G01C 21/3658 |
| 2020/0073404 | A1* | 3/2020 | Shi | G05D 1/0257 |

FOREIGN PATENT DOCUMENTS

| | | | | | |
|---|---|---|---|---|---|
| CN | 103476124 | A | * | 12/2013 | |
| CN | 104848850 | A | * | 8/2015 | |
| CN | 105608927 | A | * | 5/2016 | .......... B60W 30/095 |
| CN | 102622370 | B | * | 2/2017 | |
| CN | 106491208 | A | * | 3/2017 | |
| CN | 112013857 | A | * | 12/2020 | |
| CN | 112659974 | A | * | 4/2021 | |
| JP | 2002032284 | A | * | 1/2002 | |
| JP | 2003247833 | A | * | 9/2003 | |
| JP | 2004125499 | A | * | 4/2004 | |
| JP | 4019865 | B | | 10/2007 | |
| JP | 2008096209 | A | * | 4/2008 | |
| JP | 4265288 | B2 | * | 5/2009 | |
| JP | 2012117906 | A | * | 6/2012 | |
| JP | 5007336 | B2 | * | 8/2012 | .......... G01C 21/367 |
| JP | 2019-184761 | A | | 10/2019 | |
| JP | 6606049 | B | | 10/2019 | |
| JP | 6620378 | B | | 11/2019 | |
| JP | 6693685 | B | | 4/2020 | |
| JP | 6816924 | B2 | * | 1/2021 | |
| JP | 6912859 | B2 | * | 8/2021 | |
| JP | 2022108010 | A | * | 7/2022 | .......... B60W 60/001 |
| KR | 20080104278 | A | * | 12/2008 | |

\* cited by examiner

MAP INFORMATION OUTPUT DEVICE, AUTOMATIC DRIVING CONTROL SYSTEM, MAP INFORMATION OUTPUT SYSTEM, AND MAP INFORMATION OUTPUT METHOD

CROSS REFERENCE TO RELATED APPLICATION

The present application is based on and claims the benefit of priority of Japanese Patent Application No. 2021-063601, filed on Apr. 2, 2021, the disclosure of which is incorporated herein by reference.

TECHNICAL FIELD

The present disclosure generally relates to a map information output device, an automatic driving control system, a map information output system, and a map information output method.

BACKGROUND INFORMATION

A comparative vehicle disclosed in relevant art includes a high-precision map used for automatic driving control. A vehicle obtains a high-precision map from the server and updates the high-precision map stored in the map storage unit with the obtained high-precision map.

SUMMARY

It is an object of the present disclosure to provide a map information output device and an automatic driving control system as well as to provide a map information output method that are less likely to cause inconvenience in the process of constructing control map information used for automatic driving control.

BRIEF DESCRIPTION OF THE DRAWINGS

Objects, features, and advantages of the present disclosure will become more apparent from the following detailed description made with reference to the accompanying drawings, in which.

DETAILED DESCRIPTION (Overall Configuration)

Figure 1:
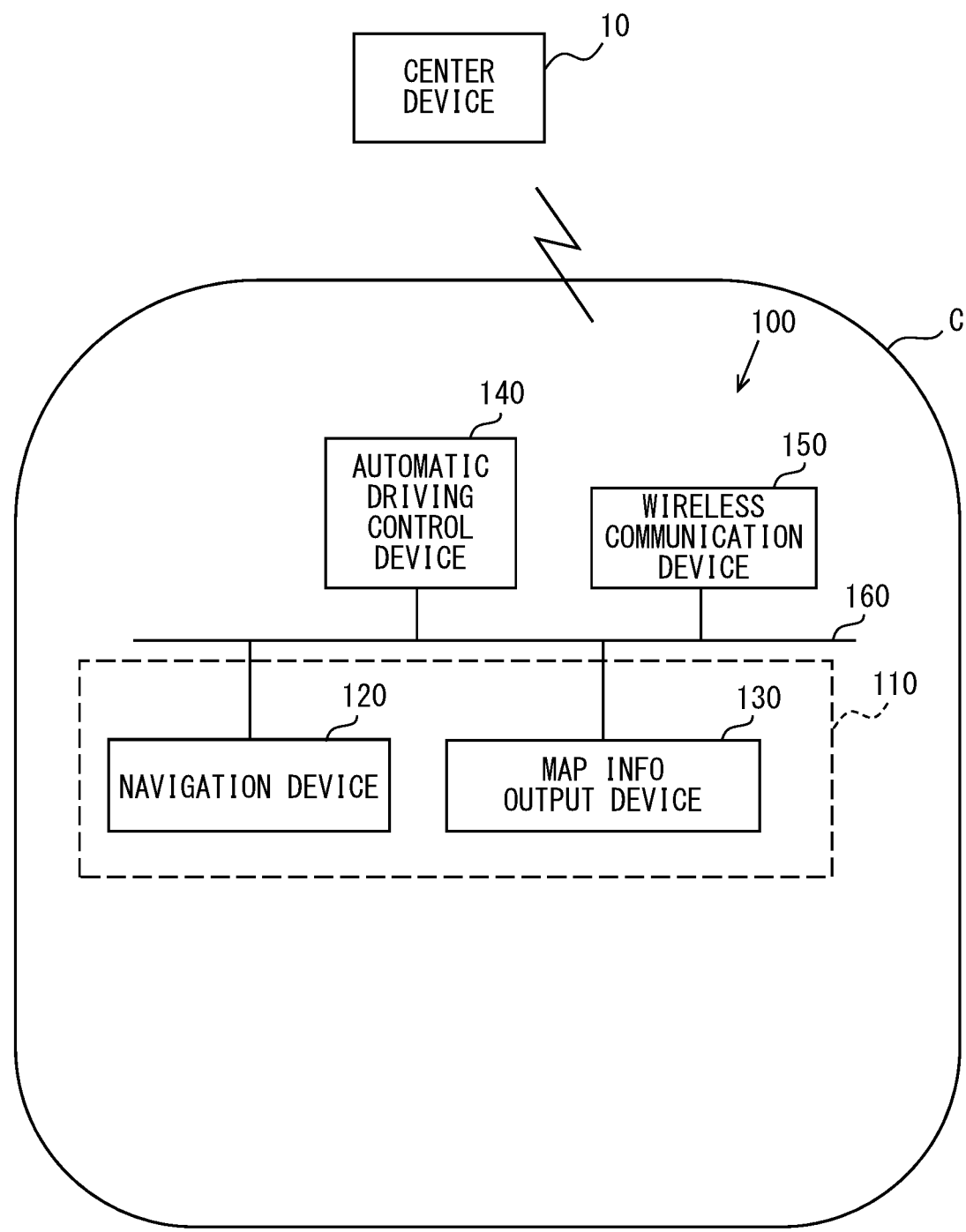
FIG. 1 is a configuration diagram of an automatic driving control system 100 mounted on a vehicle C.

FIG. 1 is a configuration diagram of an automatic driving control system 100 mounted on a vehicle C. Another automatic driving control system 100 may be mounted on another vehicle C. The automatic driving control system 100 is a system that controls the vehicle C to be automatically driven. The automatic driving here is not limited to fully-automatic driving. That is, the automatic driving here includes a low level of automatic driving, which may also be called as a driving support. The driving support executes one or more controls such as lane keeping control and front vehicle follow-up control (e.g., adaptive cruise control).

The automatic driving control system 100 wirelessly communicates with a center device 10. The center device 10 corresponds to a map distribution device, and transmits map data to the automatic driving control system 100 in response to a request from the automatic driving control system 100.

(Configuration of Center Device 10)

Figure 2:
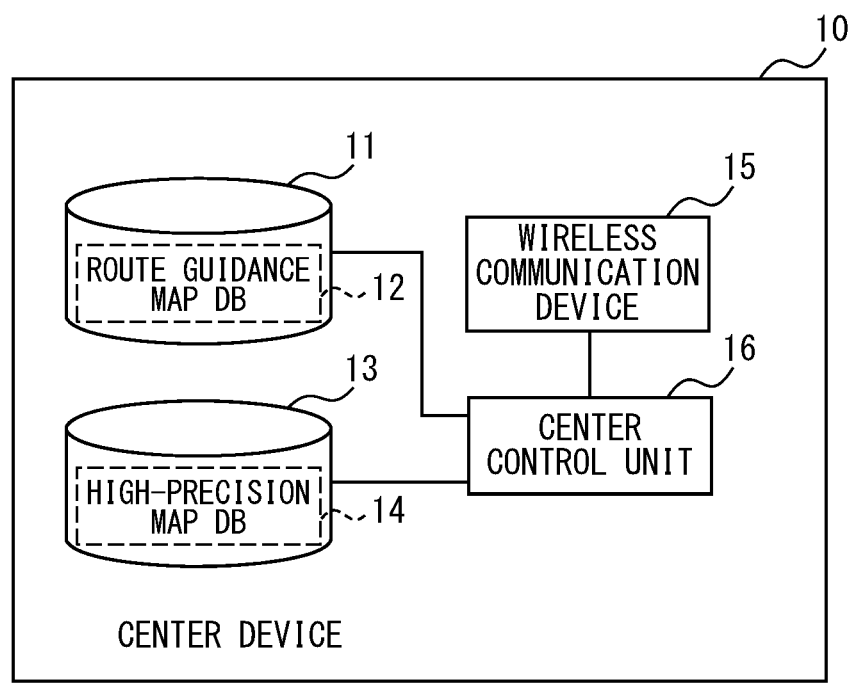
FIG. 2 is a diagram showing a configuration of a center device 10.

FIG. 2 is a diagram showing a configuration of the center device 10. The center device 10 includes a first center storage unit 11, a second center storage unit 13, a wireless communication device 15, and a center control unit 16. The first center storage unit 11 is a writable, non-volatile storage unit. A route guidance map database 12 is stored in the first center storage unit 11. The route guidance map database 12 is a database of route guidance maps. The route guidance map is a map that describes a road network. A road network map is a map that represents an actual road with nodes, road links, and the like. The node is an intersection point, e.g., a point, when each road is represented by a line. The road link represents a road section between the nodes. The road link represents a road section in a unit of roads not by a unit of lanes.

The route guidance map database 12 includes a route guidance map for a wide area. This is because the center device 10 can provide a route guidance map corresponding to a request from the automatic driving control system 100 mounted on the vehicle C, and also can reply to requests from other vehicles. For example, the route guidance map database 12 includes a route guidance map for one country as a whole. Further, the route guidance map database 12 includes not only a latest version of the route guidance map but also one or more versions of the route guidance map older than the latest version. The versions may be a subset of the country, and may be a mesh of one grid of a grid pattern of the country. The route guidance map is shown/set for each of version definition ranges. The version definition range is, for example, one mesh. The mesh means one of the partial maps divided (from one whole map) into a grid pattern. These road based route guidance maps are also known as coarse maps.

The second center storage unit 13 is a writable, non-volatile storage unit. The high-precision map database 14 is stored in the second center storage unit 13. The high-precision map database 14 is a database of high-precision maps. Whereas route guidance maps represent road maps by road links, which are links in a unit of roads, high-precision maps use lane links for representing maps, which are road maps that represent respective lanes of roads as a map. The high-precision map is a map used for automatic driving control. These lane based high-precision maps are also known as fine maps.

The high-precision map database 14 includes a high-precision map for a wide area so that a high-precision map corresponding to a request from the automatic driving control system 100 can be provided. For example, the high-precision map database 14 contains a high-precision map of one country as a whole. Further, the high-precision map database 14 includes not only the latest version of the high-precision map but also one or more high-precision maps of a version older than the latest version. The version of the high-precision map is also shown/set for each of the version definition ranges.

The version of the route guidance map and the version of the high-precision map are managed by the center control unit 16 in association with each other for consistency. Managing versions with each other for consistency means that the roads on one map can be associated with the roads on the other map. Association of roads can be performed by a link ID or the like. When the route guidance map and the high-precision map are updated at the same time, the route guidance map and the high-precision map of the same version are set to have a consistent (e.g., the same) version.

The wireless communication device 15 communicates with the automatic driving control system 100 mounted on the vehicle C. There are no particular restrictions on a wireless communication method. The wireless communication device 15 wirelessly communicates with the automatic driving control system 100 by radio waves, for example, via a public communication network.

The center control unit 16 can be realized by a configuration including at least one processor. The center control unit 16 updates the route guidance map database 12 stored in the first center storage unit 11 and updates the high-precision map database 14 stored in the second center storage unit 13 to the latest contents. In response to a request from the automatic driving control system 100, the center control unit 16 performs a process of transmitting one or both of a route guidance map and a high-precision map to the automatic driving control system 100 from the wireless communication device 15. In response to a request from the automatic driving control system 100, the center control unit 16 notifies a version of the route guidance map included in the route guidance map database 12 and a version of the high-precision map included in the high-precision map database 14 to the relevant automatic driving control system 100.

(Configuration of Automatic Driving Control System 100)

The automatic driving control system 100 includes a map information output system 110, an automatic driving control device 140, and a wireless communication device 150. The map information output system 110 is a system that outputs control map information, which is map information used for automatic driving control, to the automatic driving control device 140.

The map information output system 110 includes a navigation device 120, a map information output device 130, an automatic driving control device 140, and a wireless communication device 150. These are connected to each other to be communicable with each other by an in-vehicle LAN 160. The vehicle C is also provided with an external detection sensor that detects the external environment of the vehicle C, a vehicle state detection sensor that detects a travel state of the vehicle C, and the like.

The navigation device 120 is a route guidance device, and guides the vehicle C according to the guidance route. The route guidance includes not only a route guidance during manual driving but also a display/image output and sound output during automatic driving. The detailed configuration of the navigation device 120 will be described later.

The map information output device 130 sequentially constructs the control map information, and sequentially outputs the constructed control map information to the automatic driving control device 140. The detailed configuration of the map information output device 130 will be described later.

The automatic driving control device 140, which is an automatic driving control unit, determines a future trajectory/trace/locus/track of the vehicle C based on the control map information. Then, the automatic driving control device 140 controls a behavior of the vehicle C so that the vehicle can travel on the track. The wireless communication device 150 communicates wirelessly with the center device 10 outside the vehicle C.

(Configuration of Navigation Device 120)

Figure 3:
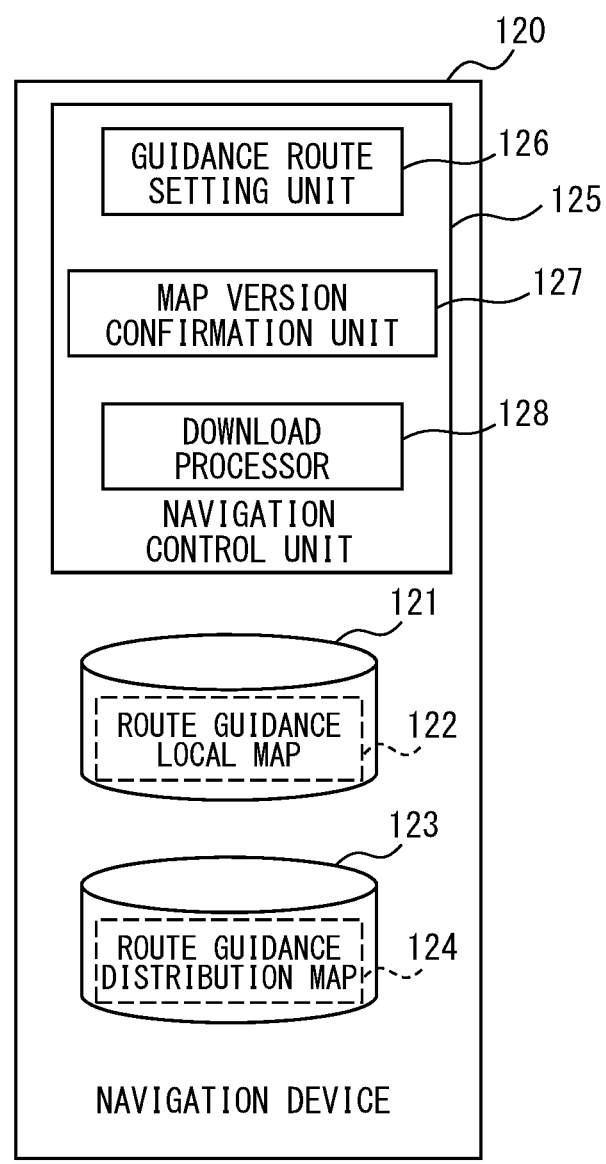
FIG. 3 is a diagram showing a configuration of a navigation device 120.

FIG. 3 is a diagram showing the configuration of the navigation device 120. The navigation device 120 includes a first navigation storage unit 121, a second navigation storage unit 123, and a navigation control unit 125. The first navigation storage unit 121 and the second navigation storage unit 123 are separate devices. However, one storage unit may function as both of the first navigation storage unit 121 and the second navigation storage unit 123.

The first navigation storage unit 121 is a writable, non-volatile storage unit. A flash memory can be used as the first navigation storage unit 121. A route guidance local map 122 is stored in the first navigation storage unit 121.

The route guidance local map 122 is a route guidance map. The area represented by the route guidance local map 122 is a wide area such as an entire country. The area represented by the route guidance local map 122 is wider than the area represented by a route guidance distribution map 124 described below.

The data representing the route guidance local map 122 also includes data indicating the map version. The map version is shown at least for each of map update units. For example, when the route guidance local map 122 is updated on a mesh-by-mesh basis, the version is shown/set for each of the meshes.

The route guidance local map 122 is stored in the first navigation storage unit 121 from the time of shipment of the vehicle C. The route guidance local map 122 may be updatable in some areas or as a whole. However, the route guidance local map 122 cannot be updated when the vehicle C is in a travelable state. The travelable state includes a state in which a power of the vehicle C is on and the vehicle C is movable by a brake-off and an accelerator-on.

The second navigation storage unit 123 is also a writable storage unit. The second navigation storage unit 123 can be a non-volatile storage unit, and a flash memory can also be used for the second navigation storage unit 123. However, the second navigation storage unit 123 may also be a volatile storage unit. The route guidance distribution map 124 is stored in the second navigation storage unit 123.

The route guidance distribution map 124 is a map that updates a part of the route guidance local map 122. The route guidance distribution map 124 is a route guidance map similar to the route guidance local map 122. The route guidance distribution map 124 can be updated when the vehicle C is in a travelable state. The data representing the route guidance distribution map 124 also includes data indicating the map version.

The navigation control unit 125 can be realized by a configuration including at least one processor. For example, the navigation control unit 125 can be realized by a computer including a processor, a non-volatile memory, a RAM, an I/O, and a bus line connecting the above. The non-volatile memory stores a program for operating a general-purpose computer as the navigation control unit 125. When the processor executes a program stored in the non-volatile memory while using a temporary storage function of the RAM, the navigation control unit 125 operates as each unit shown in FIG. 3. That is, the navigation control unit 125 operates as a guidance route setting unit 126, a map version confirmation unit 127, and a download processor 128. Operation of the above (respective components) means that a method corresponding to the program is performed.

The guidance route setting unit 126 sets a guidance route for guiding the vehicle C. In the present embodiment, when a destination is set by an operation of an occupant of the vehicle C, the guidance route setting unit 126 transmits the destination and the current position of the vehicle C to the center device 10 via the wireless communication device 150. The center device 10 searches for a route from the current position of the vehicle C to the destination, and transmits a searched route back to the vehicle C. The guidance route setting unit 126 sets the route transmitted from the center device 10 as a guidance route. However, the guidance route setting unit 126 may search for a guidance route using the route guidance local map 122 and the route guidance distribution map 124 without using the center device 10. The guidance route searched by using the route guidance local map 122 and the route guidance distribution map 124 is hereinafter referred to as a local guidance route. The route transmitted from the center device 10 will be referred to as a center guidance route in the following. The guidance route setting unit 126 may initially set a local guidance route, and when the center guidance route can be obtained from the center device 10, the guidance route may be changed/switched to the center guidance route.

The map version confirmation unit 127 communicates with the center device 10 via the wireless communication device 150, and obtains the latest version of the route guidance map (hereinafter referred to as the center map version) stored in the center device 10. The map for which the map version confirmation unit 127 obtains the center map version can be a map of all areas (for example, the whole country) of the route guidance map included in the route guidance map database 12. Alternatively, the map for which the map version confirmation unit 127 obtains the center map version can be a map of an area required for route guidance. The area where the map version confirmation unit 127 obtains the center map version may be an area determined based on the current position of the vehicle C. The map version confirmation unit 127 notifies the map information output device 130 of the obtained center map version. The navigation device 120 including the map version confirmation unit 127 is/corresponds to the first device, and the map information output device 130 for notifying the center map version is/corresponds to the second device.

The download processor 128 communicates with the center device 10 via the wireless communication device 150, and downloads a route guidance map stored in the center device 10. The download processor 128 stores the downloaded route guidance map as the route guidance distribution map 124 in the second navigation storage unit 123.

The area of the map downloaded by the download processor 128 can be determined based on the guidance route. That is, the download processor 128 can download the route guidance map of the area including the guidance route from the center device 10. In addition to that, the download processor 128 may determine the area of the route guidance map to be downloaded based on the current position of the vehicle C.

The download processor 128 compares the route guidance map database 12 and the route guidance local map 122 for each of map update units, and the route guidance map database 12 downloads the route guidance map whose version is newer. The download processor 128 downloads the route guidance map of a portion that satisfies (i) an area condition (described above) and a version condition that the version of the route guidance map database 12 is newer than that of the route guidance local map 122.

After identifying the route guidance map to be downloaded, the download processor 128 starts downloading the route guidance map. The download processor 128 downloads the route guidance map after the guidance route is set or when the navigation device 120 is activated.

(Configuration of Map Information Output Device 130)

Figure 4:
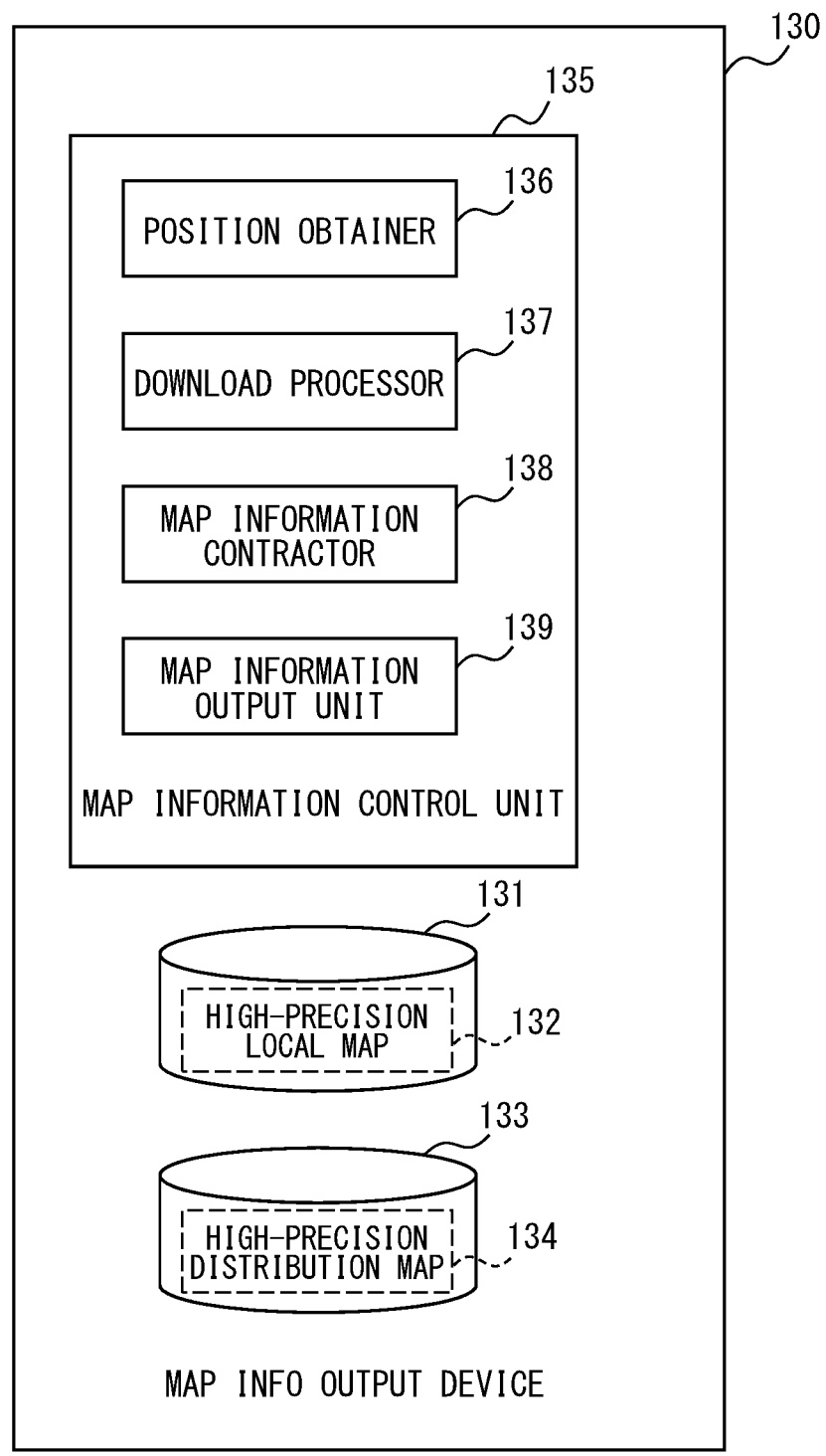
FIG. 4 is a diagram showing a configuration of a map information output device 130.

FIG. 4 is a diagram showing a configuration of the map information output device 130. The map information output device 130 includes a first map storage unit 131, a second map storage unit 133, and a map information control unit 135. The first map storage unit 131 and the second map storage unit 133 are separate devices. However, one storage unit may function as both of the first map storage unit 131 and the second map storage unit 133. The first map storage unit 131 and the high-precision local map 132 are a map storage unit, respectively.

The first map storage unit 131 is a writable, non-volatile storage unit. The high-precision local map 132 is stored in the first map storage unit 131. The high-precision local map 132 is a high-precision map. The high-precision map is an original map used for constructing the control map information. The high-precision map included in the high-precision map database 14 stored in the second center storage unit 13 is also the original map.

The high-precision local map 132 is a map of a wide area in which the position of the vehicle C can be included in the map even if the vehicle C travels and the position of the vehicle C changes sequentially. Therefore, the high-precision local map 132 does not need to sequentially download the map of the area including the current position of the vehicle C by wireless communication while the vehicle C is traveling. The area represented by the high-precision local map 132 is, for example, the entire country. Of course, the area represented by the high-precision local map 132 is wider than the area represented by the high-precision distribution map 134 described below.

The data representing the high-precision local map 132 also includes data indicating the map version. The map version is shown at least for each of map update units. The map update unit may be the same as or different from the route guidance local map 122.

The high-precision local map 132 is stored in the first map storage unit 131 from the time of shipment. The high-precision local map 132 may be updatable in some areas or as a whole. However, the high-precision local map 132 cannot be updated when the vehicle C is in a travelable state.

The high-precision local map 132 may be partially updated. However, the high-precision local map 132 is a map in which the consistency of the map is maintained as a whole. Consistency means that roads on one map version can be associated with roads on another map version. Association of roads can be performed by a link ID or the like.

The second map storage unit 133, which is a map storage unit, is also a writable storage unit. The second map storage unit 133 can be a non-volatile storage unit. However, a volatile storage unit may also be used as the second map storage unit 133. The high-precision distribution map 134 is stored in the second map storage unit 133. The high-precision distribution map 134 is a map that updates a part of the high-precision local map 132. The high-precision distribution map 134 is an original map just like the high-precision local map 132. The high-precision distribution map 134 can be updated when the vehicle C is in a travelable state. The data representing the high-precision distribution map 134 also includes data indicating the map version.

The map information control unit 135 can be realized by a configuration including at least one processor. For example, the map information control unit 135 can be realized by a computer including a processor, a non-volatile memory, a RAM, an I/O, and a bus line connecting these configurations. The non-volatile memory stores a map information output program for operating a general-purpose computer as a map information control unit 135. The map information control unit 135 operates as each of the units shown in FIG. 4 by executing the map information output program stored in the non-volatile memory while the processor uses a temporary storage function of the RAM. That is, the map information control unit 135 operates as a position obtainer 136, a download processor 137, a map information constructor 138, and a map information output unit 139. Operation of the computer as the above units means that a map information output method corresponding to the map information output program is performed.

The position obtainer 136 cyclically obtains the current position of the vehicle C. The current position of the vehicle C can be obtained from a GNSS receiver provided in the vehicle C. The vehicle C may be provided with a position detection unit that sequentially detects the current position based on (i) autonomous navigation using values detected from a vehicle speed sensor and a steering angle sensor and (ii) a position detected by the GNSS receiver. The position obtainer 136 may obtain the current position from the position detection unit. The cycle for obtaining the current position is shorter than the cycle for outputting the control map information. The cycle for obtaining the current position is, for example, 100 ms.

The download processor 137 communicates with the center device 10 via the wireless communication device 150, and downloads the high-precision map stored in the center device 10. The download processor 137 stores the downloaded high-precision map as the high-precision distribution map 134 in the second map storage unit 133.

The high-precision map database 14 of the center device 10 includes a plurality of versions of high-precision maps. The download processor 137 determines the version of the high-precision map to be downloaded from the center device 10 based on the center map version notified from the navigation device 120.

The download processor 137 compares the high-precision map database 14 and the high-precision distribution map 134 for each of map update units, and the high-precision map database 14 downloads the high-precision map of the newer version. Therefore, the download processor 137 downloads a portion of a high-precision map about/within a high-precision map obtainment/download region centered on the current position of the vehicle C, regarding which a portion in the high-precision map database 14 has a newer version than a portion in the high-precision distribution map 134.

(Flow Up to Downloading a High-Precision Map)

Figure 5:
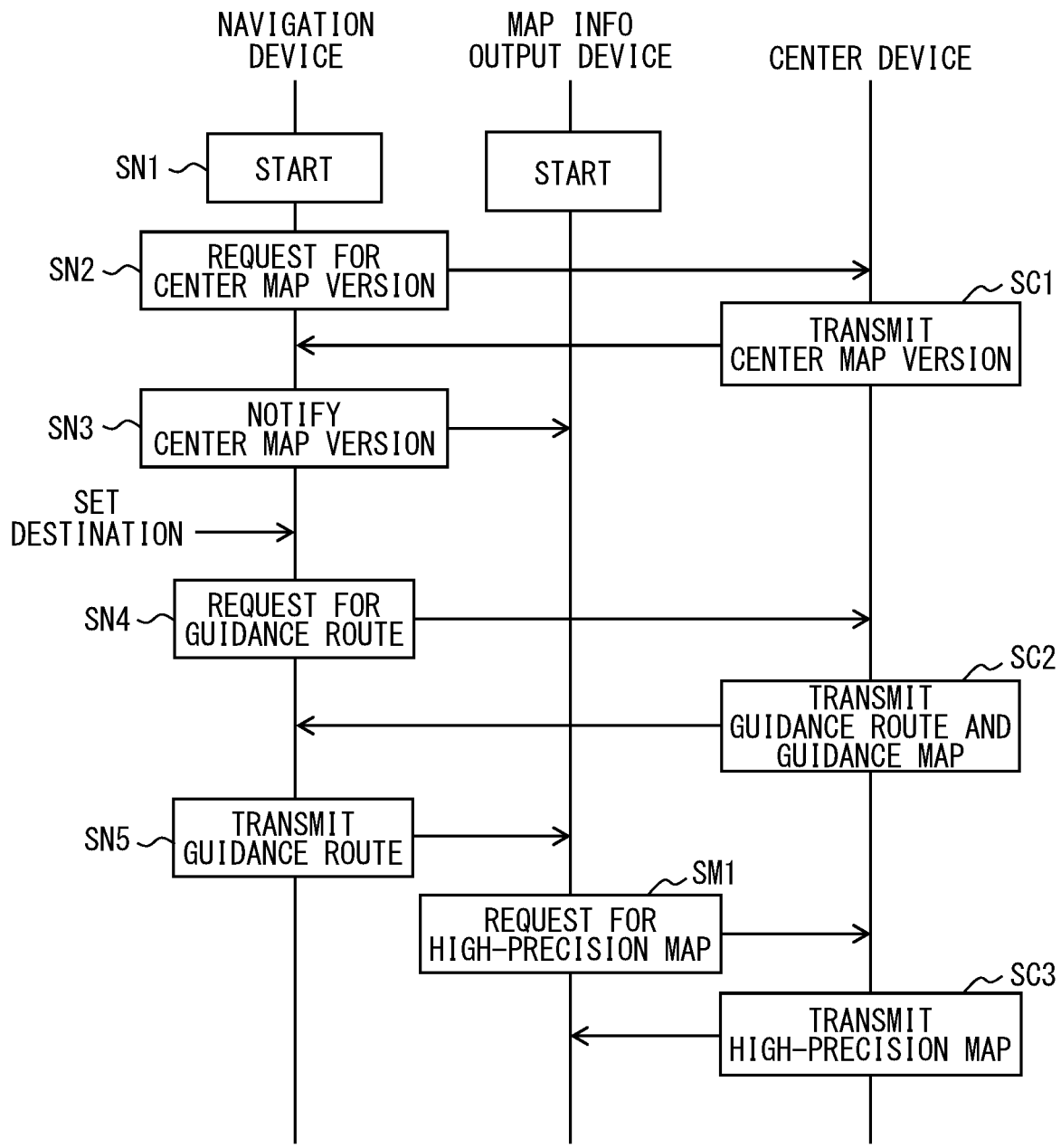
FIG. 5 is a diagram showing a flow until the map information output device 130 downloads a high-precision map.

FIG. 5 shows a flow until the map information output device 130 downloads the high-precision map at the time of start. The navigation device 120 is started in SN1. The map information output device 130 is also started at the same time as the navigation device 120. After the navigation device 120 is started, the map version confirmation unit 127 requests the center device 10 to transmit the center map version in SN2.

When the center control unit 16 of the center device 10 receives such a request, the center map version is transmitted to the navigation device 120 in SC1. When the navigation device 120 receives the center map version, the navigation device 120 transmits the center map version to the map information output device 130 in SN3.

Thereafter, when a destination is set, the guidance route setting unit 126 of the navigation device 120 requests for a guidance route to the center device 10 in SN4. The guidance route request includes information about the current position and destination of the vehicle C.

When the center control unit 16 of the center device 10 obtains a request for the guidance route, the center control unit 16 performs SC2. In SC2, the center control unit 16 searches for a guidance route. Then, the center control unit 16 transmits the searched guidance route and the route guidance map of the area required for the guidance route to the navigation device 120. The version of the route guidance map transmitted to the navigation device 120 is the center map version.

The guidance route setting unit 126 of the navigation device 120 transmits the guidance route obtained from the center device 10 to the map information output device 130 in SN5.

The download processor 137 of the map information output device 130 requests the center device 10 for a high-precision map in SM1. The map requested by the download processor 137 is a map of the area determined based on the guidance route obtained from the navigation device 120, and is a high-precision map of the portion where the high-precision distribution map 134 does not have the center map version.

The center control unit 16 extracts the high-precision map requested from the map information output device 130 from the high-precision map database 14, and transmits the extracted high-precision map to the map information output device 130. The map information output device 130 receives the high-precision map transmitted from the center device 10.

An example of the flow of first downloading the high-precision map from the center device 10 after the map information output device 130 is started is as described above. The download processor 137 may sequentially download the high-precision map from the center device 10 even while the vehicle C is traveling. An example in which the download processor 137 sequentially downloads the high-precision map from the center device 10 while the vehicle C is traveling, may include situations, such as when the guidance route is changed and when the route guidance is not performed. The range of the map downloaded by the download processor 137 while the vehicle C is traveling is a range determined based on the current position of the vehicle C. Such a range is referred to as a second range R2.

Figure 6:
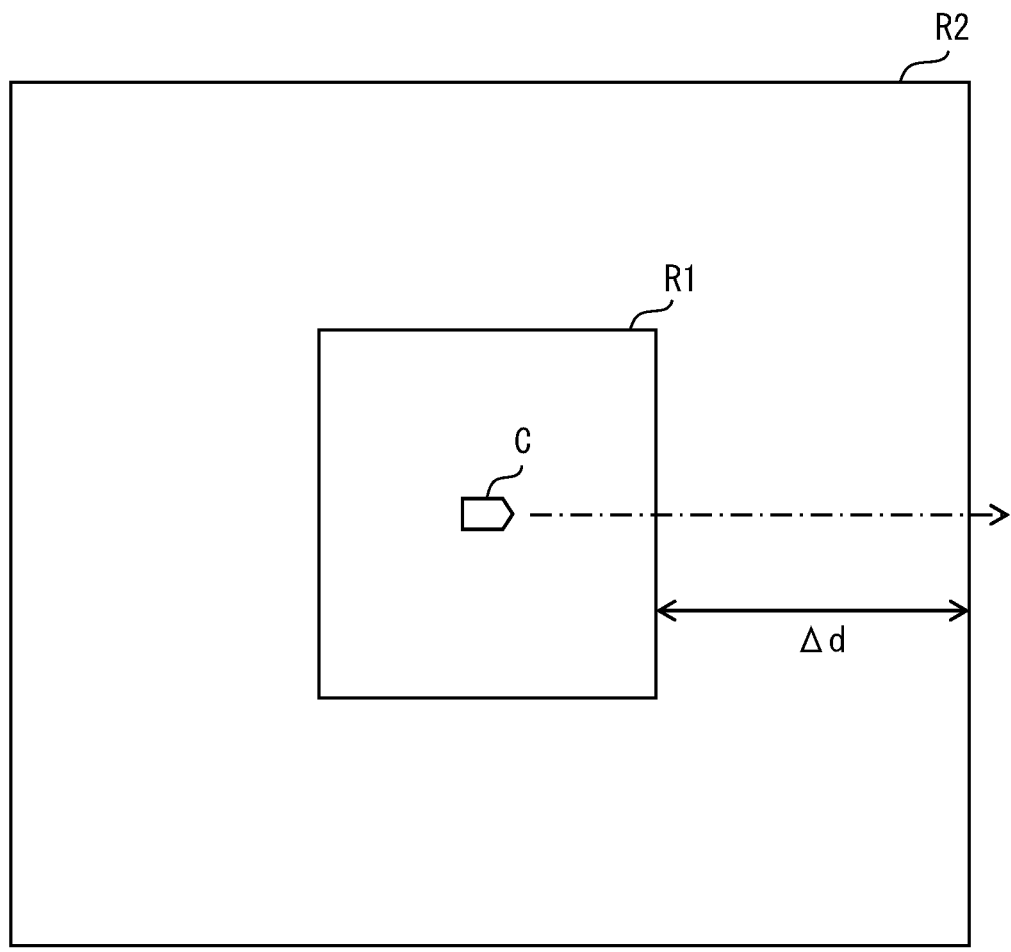
FIG. 6 is a diagram showing a first range R1 and a second range R2.

The second range R2 is a range including a first range R1 for which the map information constructor 138 described below constructs the control map information. FIG. 6 is a diagram showing a first range R1 and a second range R2 in the present embodiment. The first range R1 and the second range R2 shown in FIG. 6 are both square ranges centered on the position of the vehicle C. Unlike the above, one or both of the first range R1 and the second range R2 may have a shape other than a square (for example, a rectangle or an ellipse). The size of the first range R1 is determined from a viewpoint that it is necessary to set the size so that the control map information can be constructed. The size of the first range R1 is, for example, 10 km on one side.

The second range R2 is set to include the first range R1 as described above. This is because the construction of control map information can be continued even if the high-precision map cannot be downloaded temporarily. The larger the second range R2, the larger the amount of data to be downloaded, which is not preferable. The smaller the second range R2, the higher the possibility that the construction of the control map information will fail/will have problems. In consideration of these factors, the size of the second range R2 is set based on an experiment or the like. The size of the second range R2 is, for example, 100 km on one side.

The condition for the download processor 137 to download the high-precision map of the second range R2 is that the vehicle C has moved by a map update distance Dm from the position of the vehicle C at the time when the high-precision map was downloaded last time. Of course, even if this condition is satisfied, if the high-precision map of the second range R2 determined based on the current position of the vehicle C has already been downloaded at the time of starting, it is not necessary to download the high-precision map again.

The position of vehicle C at the time of downloading the high-precision map is any position on the vehicle trajectory/track, which extends from a position of the vehicle C when the download of the high-precision map is started to a position of the vehicle C when the download of the high-precision map is complete. The map update distance Dm is a distance shorter than a difference distance Δd between a boundary of the first range R1 and a boundary of the second range R2 closest to the boundary of the first range R1.

If the high-precision map cannot be downloaded, the download processor 137 may continuously perform the download process. However, in the present embodiment, the download processor 137 uses the position of the vehicle C when the download has failed as a reference position, and re-downloads the high-precision map after the vehicle C has traveled by the map update distance Dm from the reference position. That is, even if the download processor 137 fails to download the map (at a certain position), the next download position of the vehicle C when the download process is performed next time is sought to be a position where the download is likely to be successful.

In the present embodiment, the map update distance Dm is equal to or less than half of the difference distance Δd. Therefore, even if the high-precision map download has failed, re-download of the high-precision map is performable at least once in a state in which the first range R1 determined from the latest position of the vehicle C is included in the high-precision distribution map 134 stored in the second map storage unit 133.

Figure 7:
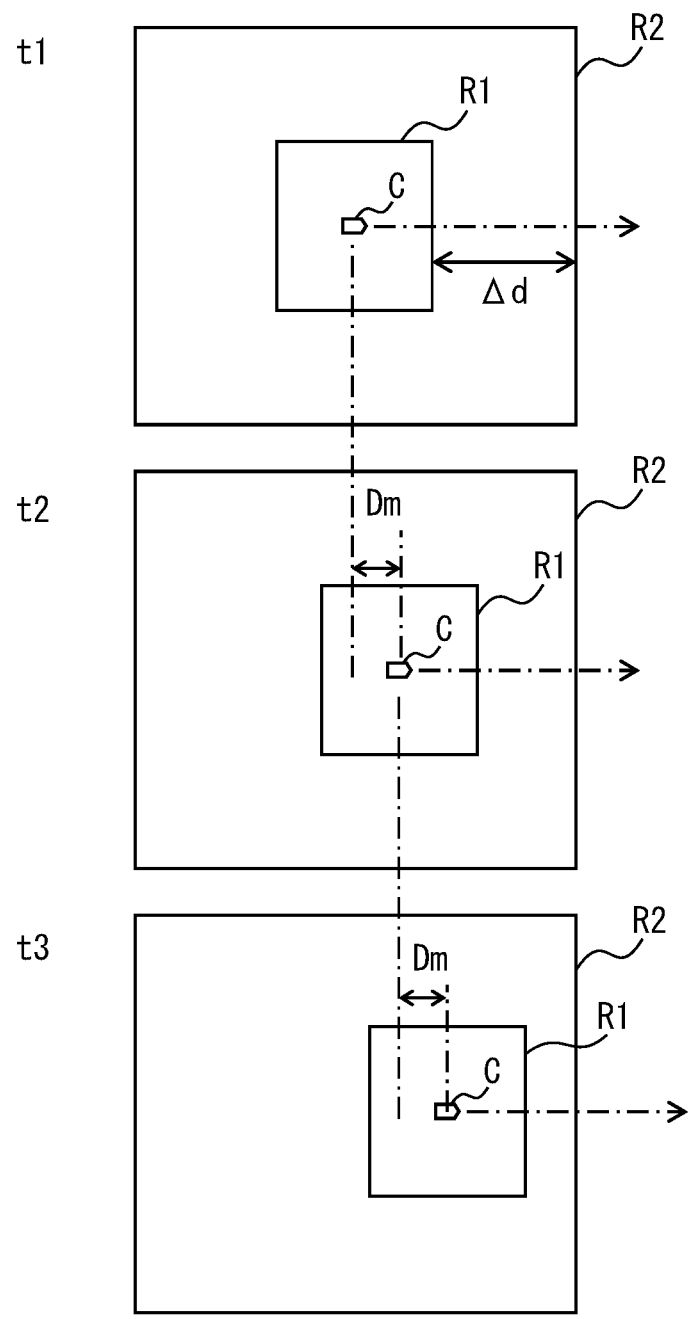
FIG. 7 is a diagram showing changes in the first range R1 and the second range R2 when a download fails.

FIG. 7 shows a change in a relative position of the first range R1 and the second range R2 when the high-precision map download fails. At time t1, the download processor 137 has successful in downloading the high-precision map. Therefore, at time t1, the high-precision map of the second range R2 is stored in the second map storage unit 133 as the high-precision distribution map 134.

At time t2, the vehicle C has moved/traveled from the position of the vehicle C at time t1 by the map update distance Dm. Therefore, the download processor 137 downloads (i.e., attempts to download) the high-precision map of the second range R2 determined with reference to the vehicle position at time t2. However, at time t2, it is assumed that the download processor 137 fails to download the high-precision map. At time t2, the first range R1 is included in the second range R2 obtained at time t1. Therefore, even if the high-precision map download has failed at time t2, the map information output device 130 can newly construct the control map information to be provided to the automatic driving control device 140.

At time t3, the vehicle C has moved in the same direction as before by the map update distance Dm from the position of the vehicle C at time t2. The download processor 137 downloads (i.e., attempts to download) a high-precision map of the second range R2 determined with reference to the vehicle position at time t3. However, it is assumed that the download processor 137 has failed to download the high-precision map even at time t3.

In the present embodiment, when the download processor 137 fails to download the high-precision map twice, it is determined that the download failure is confirmed. The number of download failures until it is determined that the download failure is confirmed is not limited to two. The download processor 137 may confirm the download failure only after one download failure. Further, the download processor 137 may determine that the download failure is confirmed when the download fails a predetermined number of times, e.g., three or more times. However, the number of times by which the download failure is confirmed is Δd/Dm or less. This is because the download failure is confirmed before the position of the vehicle C comes out of an area of the downloaded high-precision map, and because the next action is performed thereafter.

The map information constructor 138 sequentially constructs control map information based on the high-precision map of the first range R1. The control map information can be information mainly including information on the road on which the vehicle C is scheduled to travel. The control map information includes lane network information indicating a network of lanes. The control map information includes various topology information and geometry information included in the high-precision map in addition to the lane network information. Topology information is information that logically models the type and the connection form of the roads. Topology information also includes information that represents lane links. Geometry information is various information for representing an actual road and its surroundings. Geometry information includes road shape, lane marking position, road marking type and position, road sign type and position, traffic light position, and the like.

When the download processor 137 has successfully downloaded the high-precision map, the map information constructor 138 constructs the control map information using the high-precision distribution map 134. When the download processor 137 notifies the download failure confirmation, the map information constructor 138 constructs the control map information using the high-precision local map 132.

The map information constructor 138 cyclically constructs the control map information. The cycle is preset. For example, the cycle is 2 seconds.

The map information output unit 139 outputs the control map information constructed by the map information constructor 138 to the automatic driving control device 140. The map information output unit 139 notifies an automatic driving control device 140 of the following, i.e., when the map information constructor 138 switches the high-precision map for constructing the control map information from the high-precision distribution map 134 to the high-precision local map 132. The high-precision local map 132 is not (always) the latest high-precision map. This is because automatic driving control device 140 may possibly interrupt the automatic driving control if it is not the latest high-precision map.

The automatic driving control device 140 automatically controls the vehicle C based on the control map information. The automatic driving control device 140 may interrupt the automatic driving control when the map information output unit 139 notifies that the high-precision map for constructing the control map information has been switched to the high-precision local map 132.

The automatic driving control device 140 may interrupt the automatic driving control regardless of the type of the automatic driving control when the control map information is not constructed based on the latest high-precision map. Further, the automatic driving control device 140 may determine whether to interrupt or continue the automatic driving control depending on the type of the automatic driving control.

When the automatic driving control device 140 determines that the automatic driving control is to be interrupted, the automatic driving control device 140 notifies the driver of the vehicle C that the automatic driving control is to be interrupted from a notification unit mounted on the vehicle C. The notification unit is one or both of the display and the speaker.

After the above notification, the automatic driving control device 140 interrupts the automatic driving control when an automatic driving interruption condition is satisfied, such as when the driver determines that the manual driving is possible.

(Summary of the Embodiment)

The map information output device 130 of the present embodiment described above constructs control map information based on a high-precision map. The high-precision map for constructing the control map information is a high-precision map of the first range R1 determined with reference to the current position.

The map information output device 130 downloads a high-precision map from the center device 10. The range of the high-precision map downloaded from the center device 10 is not the first range R1 but the second range R2 including the first range R1. Therefore, even if the map information output device 130 cannot communicate with the center device 10, it does not immediately become impossible to create the control map information. The map information output device 130 can continue to construct the control map information corresponding to the current position for a while even if communication with the center device 10 becomes impossible. Therefore, the map information output device 130 can prevent inconvenience in the process of constructing the control map information even if the wireless communication with the center device 10 is temporarily disabled.

The condition for the download processor 137 to download the high-precision map of the second range R2 is that the vehicle C has moved by the map update distance Dm from the position of the vehicle C at the time when the high-precision map was downloaded last time. Due to such a condition, the first range R1 determined based on the current position of the vehicle C at the time of downloading the high-precision map is included in the second range R2 downloaded last time. Therefore, even if the download fails, it may be possible to construct the control map information using the downloaded high-precision map.

In the present embodiment, the map update distance Dm is equal to or less than half of the difference distance $\Delta$d. Therefore, even if the high-precision map download fails, re-download of the high-precision map is performable in a state in which the first range R1 determined from the latest position of the vehicle C is included in the high-precision distribution map 134 stored in the second map storage unit 133. Since the above is a state in which the first range R1 determined from the latest position of the vehicle C is included in the high-precision distribution map 134 stored in the second map storage unit 133, the control map information can be constructed. The download processor 137 can re-download the high-precision map in such a state.

The map information output device 130 of the present embodiment stores, as the high-precision map, not only the high-precision distribution map 134 but also the high-precision local map 132. The high-precision local map 132 is a map that represents a wider area than the high-precision distribution map 134 and is a map in which overall consistency is maintained. Since the map information output device 130 includes the high-precision local map 132, the control map information can be constructed using the high-precision local map 132 even if the high-precision map download fails.

However, the control map information constructed from the high-precision local map 132 may be not completely matchable with the control map information constructed from the high-precision distribution map 134. Therefore, when the map information constructor 138 constructs the control map information from the high-precision local map 132, the map information output unit 139 notifies the automatic driving control device 140 of such fact. In such manner, the automatic driving control device 140 can know that the control map information is constructed from the high-precision local map 132. The automatic driving control device 140 determines whether or not the ongoing automatic driving control can be continued even if the control map information constructed from the high-precision local map 132 is used, for "deciding" whether to continue the ongoing automatic driving control or not.

The automatic driving control device 140 interrupts the automatic driving control based on the notification from the map information output unit 139 that the high-precision map on which the control map information is constructed has been switched to the high-precision local map 132. There is. When the automatic driving control is interrupted, the automatic driving control device 140 notifies the driver of the vehicle C that the automatic driving control is interrupted before the automatic driving control is interrupted. As a result, the driver of the vehicle C can prepare for the case where the automatic driving control is interrupted, such as preparing for driving by himself/herself.

The navigation device 120 includes a download processor 128, and the map information output device 130 includes a download processor 137. The two download processors 128 and 137 both download the map from the center device 10.

The center device 10 updates the route guidance map database 12 and the high-precision map database 14 at any time. The timing at which the download processor 128 downloads the route guidance map and the timing at which the download processor 137 downloads the high-precision map may not be completely the same due to various circumstances. Therefore, if the download processor 128 and the download processor 137 respectively download the latest maps, the version of the downloaded map may be unmatching to each other, possibly causing inconsistency with each other, between the route guidance map and the high-precision map.

However, the navigation device 120 includes a map version confirmation unit 127, and obtains a map version to be downloaded from the center device 10. Then, the navigation device 120 notifies the map information output device 130 of the obtained version. The download processor 137 of the map information output device 130 downloads, from the center device 10, the high-precision map corresponding to the version notified from the navigation device 120. Therefore, it is possible to prevent the download processor 128 and the download processor 137 from downloading maps that do not correspond to each other.

Although the embodiment has been described above, the disclosed technology is not limited to the above-described embodiment, and the following modifications are included in the present disclosure, and various modifications can be made without departing from the spirit of the present disclosure. In the following description, elements having the same reference symbols as those used so far are the same as elements having the same reference symbols in the above embodiment, except when specifically mentioned. When only a part of the configuration is described, the embodiment described above can be applied to other parts of the configuration.

(First Modification)

In the embodiment, the navigation device 120 is the first device, and the map information output device 130 is the second device. However, the map information output device 130 may be the first device and the navigation device 120 may be the second device. In such case, the map information output device 130 includes a map version confirmation unit.

(Second Modification)

In the embodiment, the map information output device 130 downloads the high-precision map from the center device 10 after obtaining the guidance route from the map information output device 130 at the time of start. However, the map information output device 130 may download the high-precision map from the center device 10 regardless of whether or not the guidance route is obtained. In such case, the area of the high-precision map to be downloaded can be the same as during traveling. Further, the map information output device 130 may download a high-precision map of a wider area than during traveling at the time of starting the device.

(Third Modification)

The control units 125, 135 and methods thereof described in the present disclosure may be realized by a dedicated computer constituted by a processor programmed to perform one or more functions embodied by a computer program. Alternatively, the control units 125, 135 and the method thereof described in the present disclosure may be realized by a dedicated hardware logic circuit. Alternatively, the controls 125, 135 and methods thereof described in the present disclosure may also be realized by one or more dedicated computers composed as a combination of a processor that performs a computer program and one or more hardware logic circuits. The hardware logic circuits may be, for example, ASIC or FPGA.

The storage medium for storing the computer program is not limited to ROM. Alternatively, the computer program may be stored in a computer-readable, non-transitory, tangible storage medium as instructions to be performed by a computer. For example, the program may be stored in a flash memory.

What is claimed is:

1. A map information output device including a map information output unit outputting control map information used for enabling automatic driving control of a vehicle to an automatic driving control unit, the map information output device comprising:
    a map storage unit configured to store at least one original map for constructing the control map information;
    a position obtainer configured to obtain a current position of the vehicle;
    a map information constructor configured to sequentially construct control map information; and
    a download processor configured to download and store map information, based on the current position of the vehicle and a range, sequentially from a map distribution device outside the vehicle by wireless communication,
    wherein
    the map information constructor sequentially constructs initial control map information based on an original map of a first range determined based on the current position,
    when the vehicle has traveled from the current position to a subsequent position, the download processor downloads and stores an original map of a second range, based on the current position of the vehicle and including the first range, and the map information constructor constructs new control map information based on the original map of the second range,
    wherein
    the download processor starts to download the original map of the second range based on
    the vehicle traveling from the current position to the subsequent position by an amount greater than or equal to a map update distance, the map update distance being shorter than a difference distance between a boundary of the first range and a boundary of the second range, wherein the map update distance is equal to or less than a distance of movement from the current position by the vehicle that causes the difference distance to be 0,
    wherein
    the map information output unit is configured to output the initial control map information and the new control map information to the automatic driving control unit of the vehicle,
    the automatic driving control unit determines whether control of a behavior of the vehicle based on the initial control map information and the new control map information is continuable, and
    the automatic driving control unit controls the behavior of the vehicle based on the initial control map information and the new control map information.

2. The map information output device of claim 1, wherein the map update distance is less than half of the difference distance, and
    when the download processor has failed to download the original map, the download processor starts to download the original map again after traveling a distance of equal to the map update distance from the previous download position of the vehicle.

3. The map information output device of claim 1, wherein the map storage unit stores the downloaded distribution map, which is the original map, and the local map, which includes an area wider than the distribution map,
    when the download processor fails to download the original map a preset number of times, the download processor determines that the download failure has been confirmed,
    the map information constructor
    i) constructs the control map information based on the latest distribution map, when the download processor has successfully downloaded the original map, and ii) constructs the control map information based on the local map, when the download processor determines that the download failure is confirmed, and when the map information constructor switches the original map for constructing the control map information from the distribution map to the local map, the map information output unit notifies the automatic driving control unit of such a situation.

4. An automatic driving control system comprising:
a map information output device including a map information output unit outputting control map information used for enabling automatic driving control of a vehicle to an automatic driving control unit, the map information output device comprising:
a map storage unit configured to store at least one original map for constructing the control map information;
a position obtainer configured to obtain a current position of the vehicle;
a map information constructor configured to sequentially construct control map information; and
a download processor configured to download and store map information, based on the current position of the vehicle and a range, sequentially from a map distribution device outside the vehicle by wireless communication,
wherein
the map information constructor sequentially constructs initial control map information based on an original map of a first range determined based on the current position,
when the vehicle has traveled from the current position to a subsequent position, the download processor downloads and stores an original map of a second range, based on the current position of the vehicle and including the first range, and the map information constructor constructs new control map information based on the original map of the second range,
wherein
the download processor starts to download the original map of the second range based on the vehicle traveling from the current position to the subsequent position by an amount greater than or equal to a map update distance, the map update distance being shorter than a difference distance between a boundary of the first range and a boundary of the second range, wherein the map update distance is equal to or less than a distance of movement from the current position by the vehicle that causes the difference distance to be 0,
wherein
the map information output unit is configured to output the initial control map information and the new control map information to the automatic driving control unit of the vehicle,
the automatic driving control unit determines whether control of a behavior of the vehicle based on the initial control map information and the new control map information is continuable, and
the automatic driving control unit controls the behavior of the vehicle based on the initial control map information and the new control map information, wherein
in case of interrupting the automatic driving control based on a notification from the map information output unit that the original map on which the control map information is constructed has been switched to the local map, before interrupting the automatic driving control, the automatic driving control unit notifies a driver of the vehicle that the automatic driving control will be interrupted.

5. A map information output comprising:
a route guidance device that provides route guidance based on a route guidance map different from the original map;
a map information output device including a map information output unit outputting control map information used for enabling automatic driving control of a vehicle to an automatic driving control unit, the map information output device comprising:
a map storage unit configured to store at least one original map for constructing the control map information;
a position obtainer configured to obtain a current position of the vehicle;
a map information constructor configured to sequentially construct control map information; and
a download processor configured to download and store map information, based on the current position of the vehicle and a range, sequentially from a map distribution device outside the vehicle by wireless communication,
wherein
the map information constructor sequentially constructs initial control map information based on an original map of a first range determined based on the current position,
when the vehicle has traveled from the current position to a subsequent position, the download processor downloads and stores an original map of a second range, based on the current position of the vehicle and including the first range, and the map information constructor constructs new control map information based on the original map of the second range,
wherein
the download processor starts to download the original map of the second range based on the vehicle traveling from the current position to the subsequent position by an amount greater than or equal to a map update distance, the map update distance being shorter than a difference distance between a boundary of the first range and a boundary of the second range, wherein the map update distance is equal to or less than a distance of movement from the current position by the vehicle that causes the difference distance to be 0,
wherein
the map information output unit is configured to output the initial control map information and the new control map information to the automatic driving control unit of the vehicle,
the automatic driving control unit determines whether control of a behavior of the vehicle based on the initial control map information and the new control map information is continuable, and
the automatic driving control unit controls the behavior of the vehicle based on the initial control map information and the new control map information; and
a download processor downloading at least a part of the route guidance map from the map distribution device, wherein
based on an assumption that one of the route guidance device and the map information output device is a first device, and the other is a second device,
the first device includes a map version confirmation unit that obtains a version of a map to be downloaded from the map distribution device and notifies the second device of the obtained version, and the download processor included in the second device determines the version of the map to be downloaded based on the version notified from the first device.

6. A map information output method comprising steps of:

obtaining a current position of a vehicle;

from a map storage unit that stores an original map for constructing control map information used for enabling automatic driving control of the vehicle, obtaining the original map of a first range determined based on the current position and sequentially constructing initial control map information based on the original map of the first range determined based on the current position;

when the vehicle has traveled from the current position to a subsequent position, sequentially downloading, from a map distribution device outside the vehicle via wireless communication, an original map of a second range, which is a range determined based on the current position and includes the first range, storing the original map of the second range in the map storage unit, and constructing new control map information based on the original map of the second range; and outputting the initial control map information and the new control map information to an automatic driving control device of the vehicle, wherein the original map of the second range is downloaded based on the vehicle traveling from the current position to the subsequent position by an amount greater than or equal to a map update distance, the map update distance being shorter than a difference distance between a boundary of the first range and a boundary of the second range, wherein the map update distance is equal to or less than a distance of movement from the current position by the vehicle that causes the difference distance to be 0, and wherein the automatic driving control device determines whether control of a behavior of the vehicle based on the initial control map information and the new control map information is continuable, and the automatic driving control device controls the behavior of the vehicle based on the initial control map information and the new control map information.

7. The map information output device of claim 1, wherein the first range and the second range differ in length.

8. A map information output device including a map information output unit outputting control map information used for enabling automatic driving control of a vehicle to an automatic driving control unit, the map information output device comprising:

a map storage unit configured to store at least one original map for constructing the control map information;

a position obtainer configured to obtain a current position of the vehicle;

a map information constructor configured to sequentially construct control map information; and a download processor configured to download and store map information, based on the current position of the vehicle and a range, sequentially from a map distribution device outside the vehicle by wireless communication, wherein the map information constructor sequentially constructs initial control map information based on an original map of a first range determined based on the current position, when the vehicle has traveled from the current position to a subsequent position, the download processor downloads and stores an original map of a second range, based on the current position of the vehicle and including the first range, and the map information constructor constructs new control map information based on the original map of the second range, wherein the download processor starts to download the original map of the second range based on the vehicle traveling from the current position to the subsequent position by an amount greater than or equal to a map update distance, the map update distance being shorter than a difference distance between a boundary of the first range and a boundary of the second range, wherein the map update distance is equal to or less than a distance of movement from the current position by the vehicle that causes the difference distance to be 0, wherein the map information output unit is configured to output the initial control map information and the new control map information to the automatic driving control unit of the vehicle, the automatic driving control unit determines whether control of a behavior of the vehicle based on the initial control map information and the new control map information is continuable, the automatic driving control unit controls the behavior of the vehicle based on the initial control map information and the new control map information, the map information constructor constructs the control map information based on the latest distribution map, when the download processor has successfully downloaded the original map, when the download processor has failed to download the original map, the download processor starts to download the original map again, and the map information constructor constructs the control map information based on the local map, when the download processor determines that the download failure is confirmed.

9. A map information output method comprising steps of:

obtaining a current position of a vehicle;

from a map storage unit that stores an original map for constructing control map information used for enabling automatic driving control of the vehicle, obtaining the original map of a first range determined based on the current position and sequentially constructing initial control map information based on the original map of the first range determined based on the current position;

when the vehicle has traveled from the current position to a subsequent position, sequentially downloading, from a map distribution device outside the vehicle via wireless communication, an original map of a second range, which is a range determined based on the current position and includes the first range, storing the original map of the second range in the map storage unit, and constructing new control map information based on the original map of the second range; and outputting the initial control map information and the new control map information to an automatic driving control device of the vehicle, wherein the original map of the second range is downloaded based on the vehicle traveling has traveled from the current position to the subsequent position by an amount greater than or equal to a map update distance, the map update distance being shorter than a difference distance between a boundary of the first range and a boundary of the second range, wherein the map update distance is equal to or less than a distance of movement from the current position by the vehicle that causes the difference distance to be 0, wherein the automatic driving control device determines whether control of a behavior of the vehicle based on the initial control map information and the new control map information is continuable, the automatic driving control device controls the behavior of the vehicle based on the initial control map information and the new control map information, the map information constructor constructs the control map information based on the latest distribution map, when the download processor has successfully downloaded the original map, when the download processor has failed to download the original map, the download processor starts to download the original map again, and the map information constructor constructs the control map information based on the local map, when the download processor determines that the download failure is confirmed.

10. The map information output device of claim 1, wherein the map update distance is shorter than the first range.

* * * * *